United States Patent
Steg et al.

(10) Patent No.: US 11,342,813 B2
(45) Date of Patent: May 24, 2022

(54) PRINTED CIRCUIT BOARD AXIAL FLUX MOTOR WITH THERMAL ELEMENT

(71) Applicant: Blue Canyon Technologies Inc., Boulder, CO (US)

(72) Inventors: Stephen Steg, Erie, CO (US); Matthew James Carton, Boulder, CO (US); Bryce Allen Peters, Longmont, CO (US)

(73) Assignee: Blue Canyon Technologies Inc., Boulder, CO (US)

( * ) Notice: Subject to any disclaimer, the term of this patent is extended or adjusted under 35 U.S.C. 154(b) by 340 days.

(21) Appl. No.: 15/358,238

(22) Filed: Nov. 22, 2016

(65) Prior Publication Data

US 2017/0317558 A1     Nov. 2, 2017

Related U.S. Application Data

(60) Provisional application No. 62/330,122, filed on Apr. 30, 2016.

(51) Int. Cl.
*H02K 9/22* (2006.01)
*H02K 15/03* (2006.01)
*B64G 1/28* (2006.01)
*H02K 21/24* (2006.01)
*H02K 3/26* (2006.01)

(52) U.S. Cl.
CPC ............... *H02K 9/22* (2013.01); *B64G 1/28* (2013.01); *H02K 3/26* (2013.01); *H02K 15/03* (2013.01); *H02K 21/24* (2013.01); *H02K 2213/03* (2013.01)

(58) Field of Classification Search
CPC ............ H02K 9/22; H02K 3/26; H02K 21/24; H02K 15/03; H02K 2213/03; H02K 1/182; H02K 16/02; H02K 2211/03; B64G 1/28

USPC .............................................. 310/52, 64, 65
See application file for complete search history.

(56) References Cited

U.S. PATENT DOCUMENTS

| | | | |
|---|---|---|---|
| 2,970,238 A | 1/1961 | Swiggett | |
| 3,144,574 A | 10/1964 | Henry-Baudot | |
| 3,550,645 A | 12/1970 | Keogh | |
| 3,566,727 A | 3/1971 | Weiss | |
| 3,988,024 A | 10/1976 | Watanabe | |

(Continued)

FOREIGN PATENT DOCUMENTS

GB        2485185 A   *   5/2012   ............... H02K 3/28

OTHER PUBLICATIONS

Received STIC search report from EIC 2800 searcher Mesfin Getaneh dated Jul. 31, 2018 for claim 1. (Year: 2018).*

(Continued)

*Primary Examiner* — Emily P Pham
*Assistant Examiner* — Htet Z Kyaw
(74) *Attorney, Agent, or Firm* — The Ollila Law Group LLC

(57) ABSTRACT

The present disclosure relates to an axial flux motor for a reaction wheel, and method of using and making the same. The motor includes a stator and a rotor. The stator comprises a printed circuit board (PCB) including a first motor coil. The rotor is coupled to a first ring-shaped magnet having an alternating pole arrangement. In a further embodiment, the rotor includes permanent magnets, and the stator PCB includes a first motor coil, and a first high thermal conductivity element.

34 Claims, 15 Drawing Sheets

(56) References Cited

U.S. PATENT DOCUMENTS

| | | | |
|---|---|---|---|
| 4,007,390 A | 2/1977 | Muller | |
| 4,068,143 A | 1/1978 | Whiteley | |
| 4,072,881 A | 2/1978 | Ban | |
| 4,228,384 A | 10/1980 | Arnold, Jr. | |
| 4,340,833 A | 7/1982 | Sudo | |
| 4,398,112 A | 8/1983 | van Gils | |
| 5,146,144 A | 9/1992 | Lee | |
| 5,392,176 A | 2/1995 | Anderson | |
| 6,869,664 B2 | 3/2005 | Vasoya | |
| 6,911,757 B2 * | 6/2005 | Lopatinsky | H02K 1/12 310/164 |
| 7,109,625 B1 * | 9/2006 | Jore | H02K 21/24 310/198 |
| 9,673,684 B2 * | 6/2017 | Shaw | H02K 3/26 |
| 9,859,763 B2 * | 1/2018 | Shaw | H02K 9/22 |
| 10,170,953 B2 * | 1/2019 | Shaw | H05K 1/0298 |
| 2005/0093393 A1 * | 5/2005 | Hirzel | H02K 3/12 310/268 |
| 2006/0043916 A1 * | 3/2006 | Henslee | H02P 25/18 318/432 |
| 2006/0055265 A1 * | 3/2006 | Zalusky | H02K 21/24 310/156.32 |
| 2006/0202584 A1 * | 9/2006 | Jore | H02K 21/24 310/179 |
| 2007/0290582 A1 * | 12/2007 | Han | H02K 1/06 310/68 R |
| 2010/0142155 A1 * | 6/2010 | Mertol | H01L 23/367 361/719 |
| 2011/0221287 A1 * | 9/2011 | Lucchi | H02K 3/24 310/54 |
| 2012/0273164 A1 * | 11/2012 | Vetrovec | H01L 23/473 165/104.13 |
| 2013/0082147 A1 | 4/2013 | De Castro | |
| 2013/0181565 A1 * | 7/2013 | Petro | H02K 1/02 310/156.33 |
| 2015/0048695 A1 * | 2/2015 | Stoltenberg | H02K 16/00 310/23 |
| 2017/0047793 A1 * | 2/2017 | Klassen | H02K 1/02 |
| 2017/0098973 A1 * | 4/2017 | Shaw | H02K 3/26 |
| 2017/0098982 A1 * | 4/2017 | Shaw | H02K 9/22 |
| 2018/0337572 A1 * | 11/2018 | Miyama | H02K 3/522 |

OTHER PUBLICATIONS

Received STIC search report from EIC 2800 searcher Mesfin Getaneh dated Aug. 1, 2019 for claim 17. (Year: 2018).*
Received STIC search report from EIC 2800 searcher Mesfin Getaneh dated Aug. 2, 2018 for claim 23. (Year: 2018).*
Received STIC search report from EIC 2800 searcher Mesfin Getaneh dated Aug. 2, 2018 for claim 34. (Year: 2018).*
Received STIC search report from EIC 2800 searcher Mesfin Getaneh dated Aug. 2, 2018 for claim 47. (Year: 2018).*
Received STIC search report from EIC 2800 searcher Mesfin Getaneh dated Aug. 1, 2018 for claim 50.*
See attached NPL search history in IP.com. (Year: 2020).*
Omolbanin Taqavi, Seyed Mehdi Mirimani, "Design aspects, winding arrangements and applications of printed circuit board motors: a comprehensive review", IET Electric Power Applications journal on Jul. 21, 2020, vol. 14 Iss. 9, pp. 1505-1518. (Year: 2020).*
See attached foreign patent GB2485185A. (Year: 2012).*
Ithaco Inc., "Low cost attitude control system reaction wheel development", NASA Technical Reports Server, Mar. 8, 1991, NASA-CR-191332, United States.

* cited by examiner

PRINTED CIRCUIT BOARD AXIAL FLUX MOTOR WITH THERMAL ELEMENT

CROSS REFERENCE TO RELATED APPLICATION

This application claims priority from U.S. Provisional Patent Application No. 62/330,122 filed Apr. 30, 2016 entitled, "AXIAL FLUX MOTOR," the contents of which are incorporated herein by reference.

FIELD

The present application is in the field of brushless motors. In particular, but not exclusively, the present application relates to axial flux motors.

BACKGROUND

Spacecraft typically use rotatable devices, such as reaction wheels or gyroscopes, to control orientation after launch. For example, spacecraft with 3-axis control typically use 3 or more reaction wheels for redundancy. Increasing the mass and power consumption of a single reaction wheel can therefore have a 3+ times penalty for the spacecraft. Because power on a spacecraft is typically generated with solar arrays and stored in batteries, which are large and heavy, it is critical to minimize the mass and power consumption of spacecraft components including rotatable devices. Cube satellites, or miniaturized spacecraft that are typically measured in $10^3$ cm units, further constrain the weight, volume, and power available for a rotatable device subsystem.

Previously, spacecraft have used brushless motors to operate rotatable devices such as reaction wheels, comprising a stator with copper coils wound around an object, such as the tooth of the stator. The copper coils of the previous motors can be heavy and bulky, however.

Previous rotatable device motors have further included many separable components that must be assembled, such as copper coils, motor control electronics, and permanent magnets that comprise multiple individual magnets. The complexity of assembly is an important cost consideration in satellite building. Additional parts in a rotatable device must be balanced to avoid introducing vibrations into the spacecraft pointing, diminishing the performance of the spacecraft. Coupling separable parts together to build a motor may also increase the possibility of a motor failure if any parts detach from the motor.

In aerospace, the ability for a spacecraft to reconfigure subsystems, or to offer redundant subsystems, is highly desirable. If a subsystem fails, for example towards the end of the life of a mission, the availability of a redundant system can help extend a mission. The availability of redundant or configurable subsystems can also give mission operators the options to use the spacecraft in ways that were not part of the original mission design. Previous rotatable devices require so much additional mass and volume on a spacecraft in order to provide redundancy and reconfigurability, however, that it is not always an option to include such resources within mission constraints.

Printed circuit board (PCB) motors, which include coils that are printed on the PCB, have previously been used in low power and low torque applications such as consumer electronics such as hard disk drives, floppy disk drives, and CDROM drives. PCB motors are typically axial flux-type motors, including magnets that are energized axially through the thickness of the circuit board.

Reaction wheels require a high torque motor that can be operated in the vacuum of space. Prior PCB motors have not been suitable for space applications, however, because they produce excess heat in high torque applications, and they require air convection to cool. When coils overheat within a PCB motor, board deformation and motor failure can result.

Prior methods of cooling non-motor PCBs have included incorporating carbon fibers combined with electrically conductive material into the PCB to improve thermal conduction of a board. Electrically conductive material does not work well for the application of PCB motor coils, however, because it can create eddy currents that lead to resistive torques, inefficiencies, and wasted energy in a motor.

Prior reaction wheel motor designs have failed to optimize magnetic coupling to improve electrical efficiency and minimize vibration.

Prior reaction wheel motor designs have failed to provide for electrical redundancy with regards to coils and motor control electronics.

There is a need for a light weight, energy efficient, reliable, reaction wheel which overcomes the disadvantages of the prior art, or at least provides a useful alternative.

SUMMARY

According to a first aspect of the application there is provided an axial flux motor for a rotational device, including:

a printed circuit board (PCB) including a first stator including a first motor coil; and a rotor coupled to a first ring-shaped magnet having an alternating pole arrangement.

According to a second aspect of the application, there is provided a method of controlling a spacecraft attitude using a rotational device including an axial flux motor, the method comprising:

energizing a first motor phase of the axial flux motor, the axial flux motor comprising a printed circuit board (PCB) including a first stator including the first motor coil, the axial flux motor further including a rotor coupled to a first ring-shaped magnet having an alternating pole arrangement.

According to a third aspect of the application there is provided a method for manufacturing an axial flux motor, the method comprising:

forming a printed circuit board (PCB), wherein forming a first stator includes: providing a substrate;

forming a first coil on the substrate;

coupling a first ring-shaped magnet having an alternating pole arrangement to a rotor; and integrating the PCB and the rotor into the rotational device.

According to a fourth aspect of the application there is provided an axial flux motor for a rotational device comprising:

a rotor including a ring-shaped magnet; and a stator including a printed circuit board (PCB) comprising:

a first motor coil, and a first high thermal conductivity element adjacent to the first motor coil.

According to a fifth aspect of the application there is provided a method of cooling an axial flux motor on a spacecraft, the axial flux motor comprising a rotor and a PCB including a stator and a first high thermal conductivity element, the method comprising:

energizing a first motor phase of the stator, the stator including a first motor coil; and conducting heat away from the first motor coil via the first high thermal conductivity element, the first high thermal conductivity element being adjacent to the first motor coil.

According to a sixth aspect of the application there is provided a method for manufacturing an axial flux motor for a rotational device, the method comprising:

forming a printed circuit board (PCB) including a stator, wherein forming the stator includes:
providing a substrate;
forming a first motor coil on the substrate; and
coupling a first high thermal conductivity element adjacent to the first motor coil; and
coupling a first ring-shaped magnet having an alternating pole arrangement to a rotor; and
integrating the PCB and a rotor into the rotational device.

Other aspects of the application are described within the claims.

BRIEF DESCRIPTION OF THE DRAWINGS

Embodiments of the application will now be described, by way of example only, with reference to the accompanying drawings in which.

DETAILED DESCRIPTION OF PREFERRED EMBODIMENTS

The present disclosure describes axial flux motors for a rotatable device, methods of controlling a spacecraft attitude using a rotatable device including the axial flux motor, methods of cooling an axial flux motor, and methods for manufacturing axial flux motors.

Figure 1:
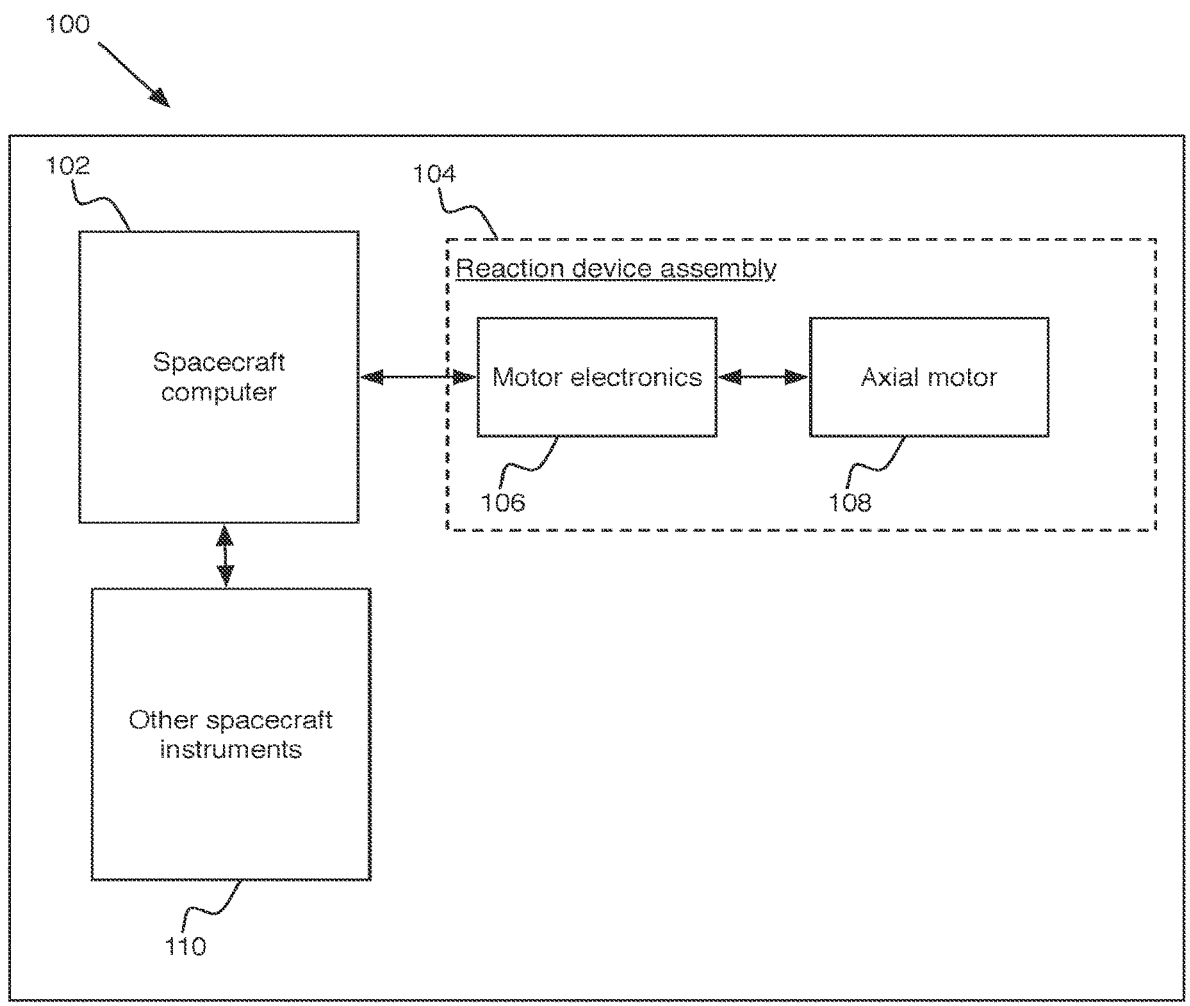
FIG. 1: shows spacecraft 100 in accordance with an embodiment of the disclosure.

In FIG. 1, a block diagram of spacecraft 100 is depicted. Spacecraft 100 includes spacecraft computer 102, rotatable device assembly 104, and other spacecraft instruments 110.

Spacecraft computer 102 may communicate with rotatable device assembly 104 and other spacecraft instruments 110. Spacecraft computer 102 may coordinate receiving, processing, and executing commands from operators. Spacecraft computer 102 may further coordinate transmitting telemetry.

Other spacecraft instruments 110 may include, but are not limited to: a receiver, a transceiver, a star tracker, a power subsystem, mechanisms, thruster, and/or remote sensing instruments.

In examples, spacecraft computer 102 may receive, process, or execute a command to change the attitude of the spacecraft that includes operating rotatable device assembly 104. In further examples, spacecraft computer 102 may autonomously control the attitude of the spacecraft with rotatable device assembly 104.

In examples, rotatable device assembly 104 may include a reaction wheel assembly or a gyroscope. Rotatable device assembly 104 may further include motor electronics 106 and axial motor 108. The depiction in FIG. 1 is not intended to be limiting, however. As those of skill in the art will readily understand, motor control electronics 106 and axial motor 108 may be separate assemblies that are electrically coupled to one another, or motor control electronics 106 may be integrated into axial motor 108.

Figure 2:
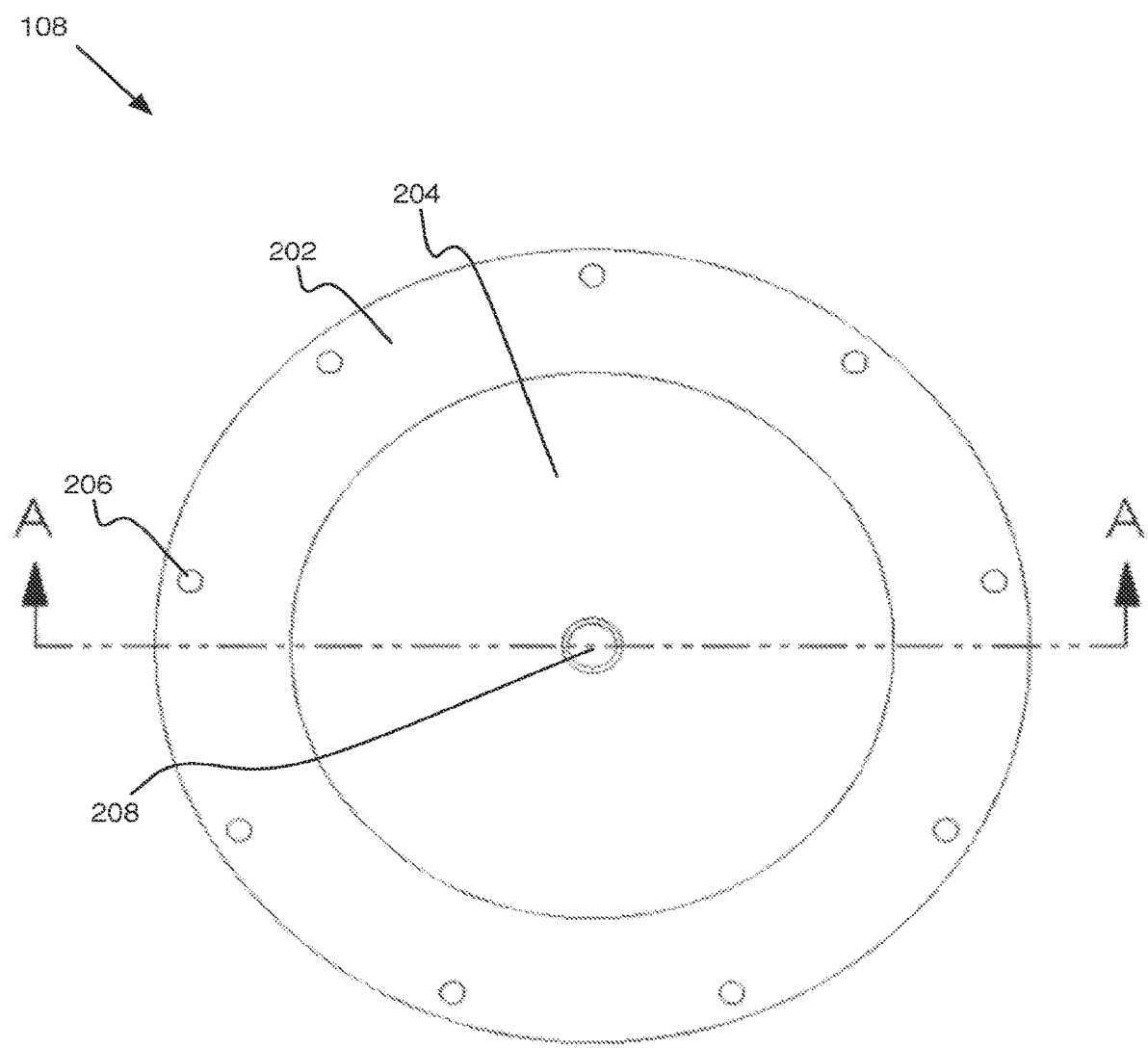
FIG. 2: shows axial flux motor 108 in accordance with an embodiment of the disclosure.
Figure 3:
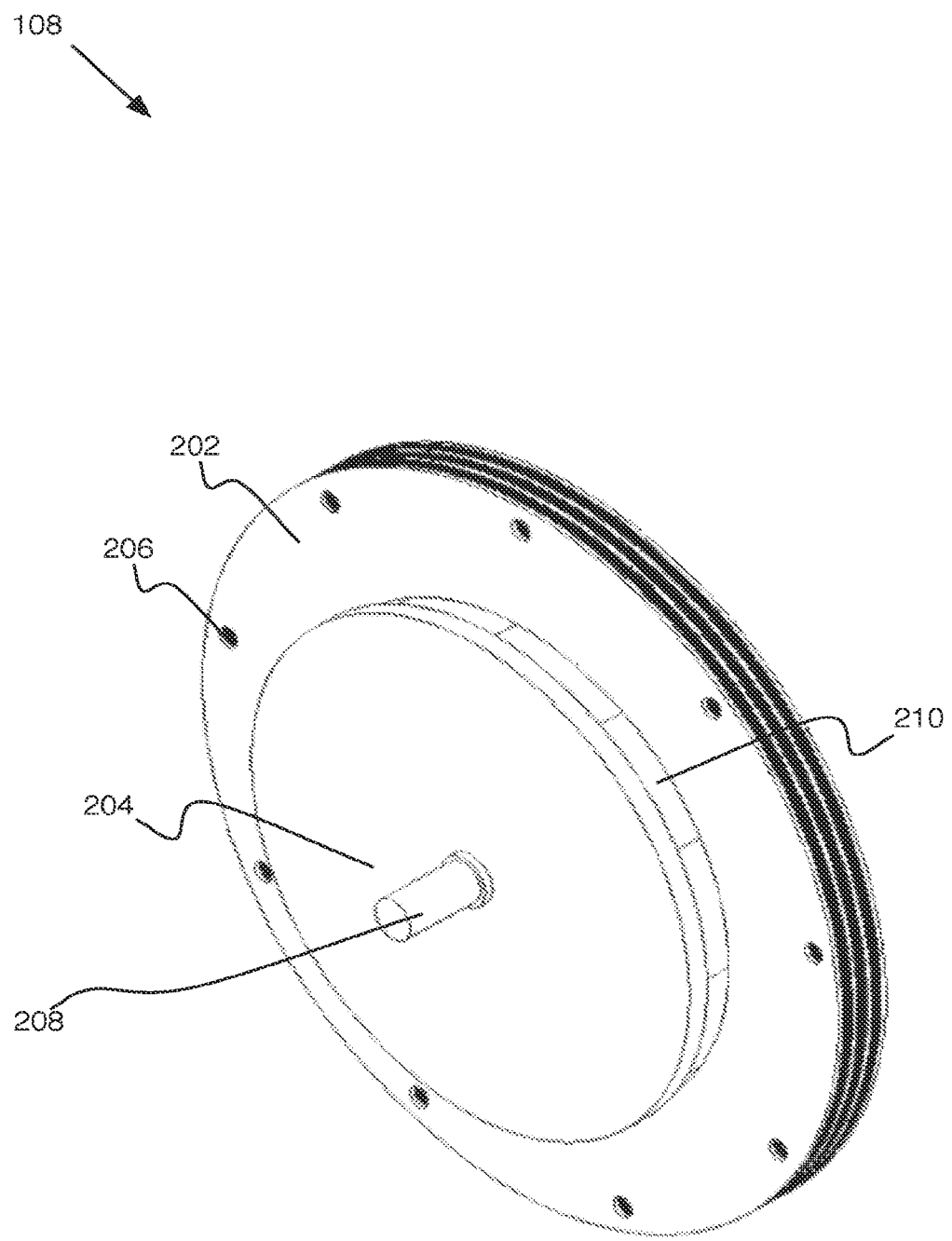
FIG. 3: shows axial motor 108 in accordance with an embodiment of the disclosure.
Figure 4:
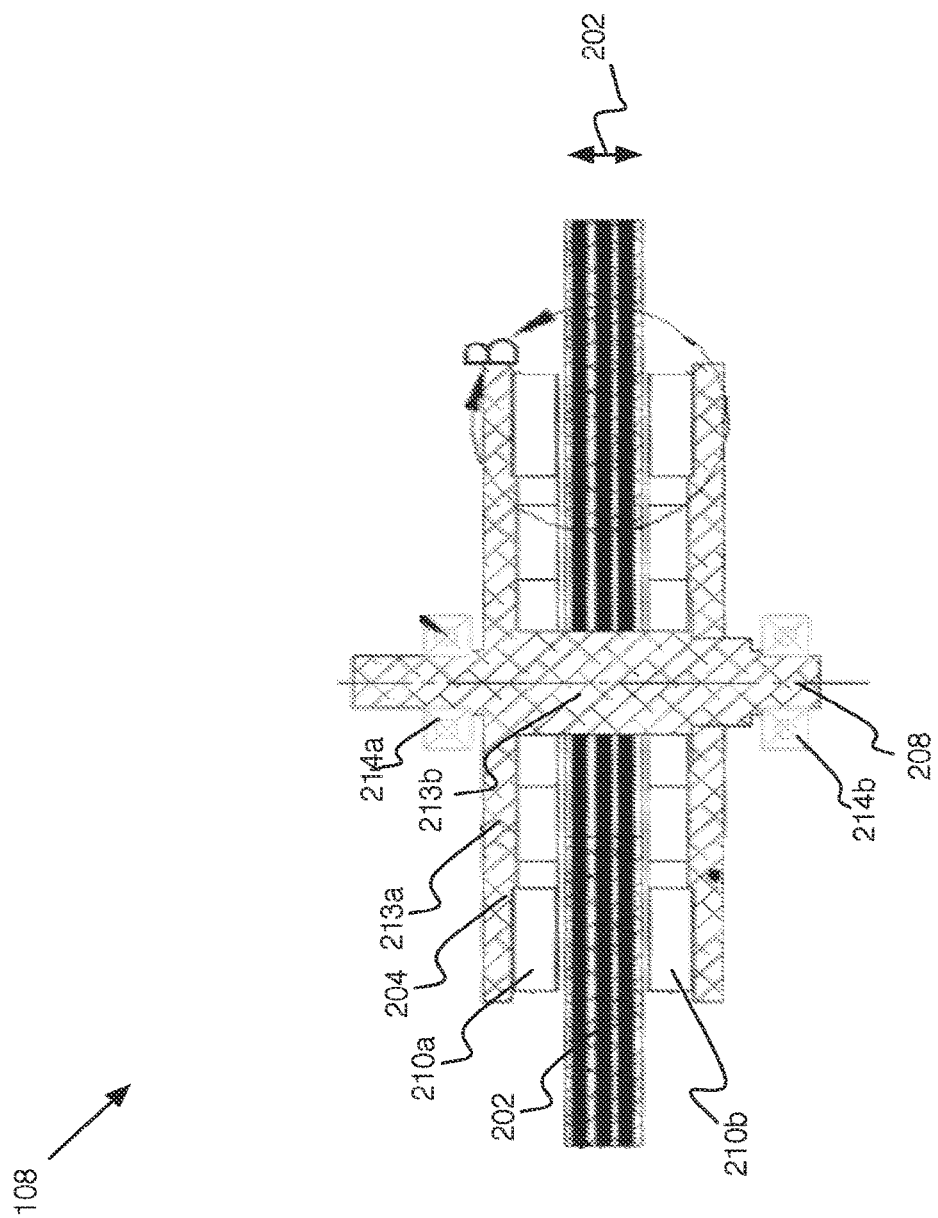
FIG. 4: shows axial motor 108 in accordance with an embodiment of the disclosure.
Figure 5:
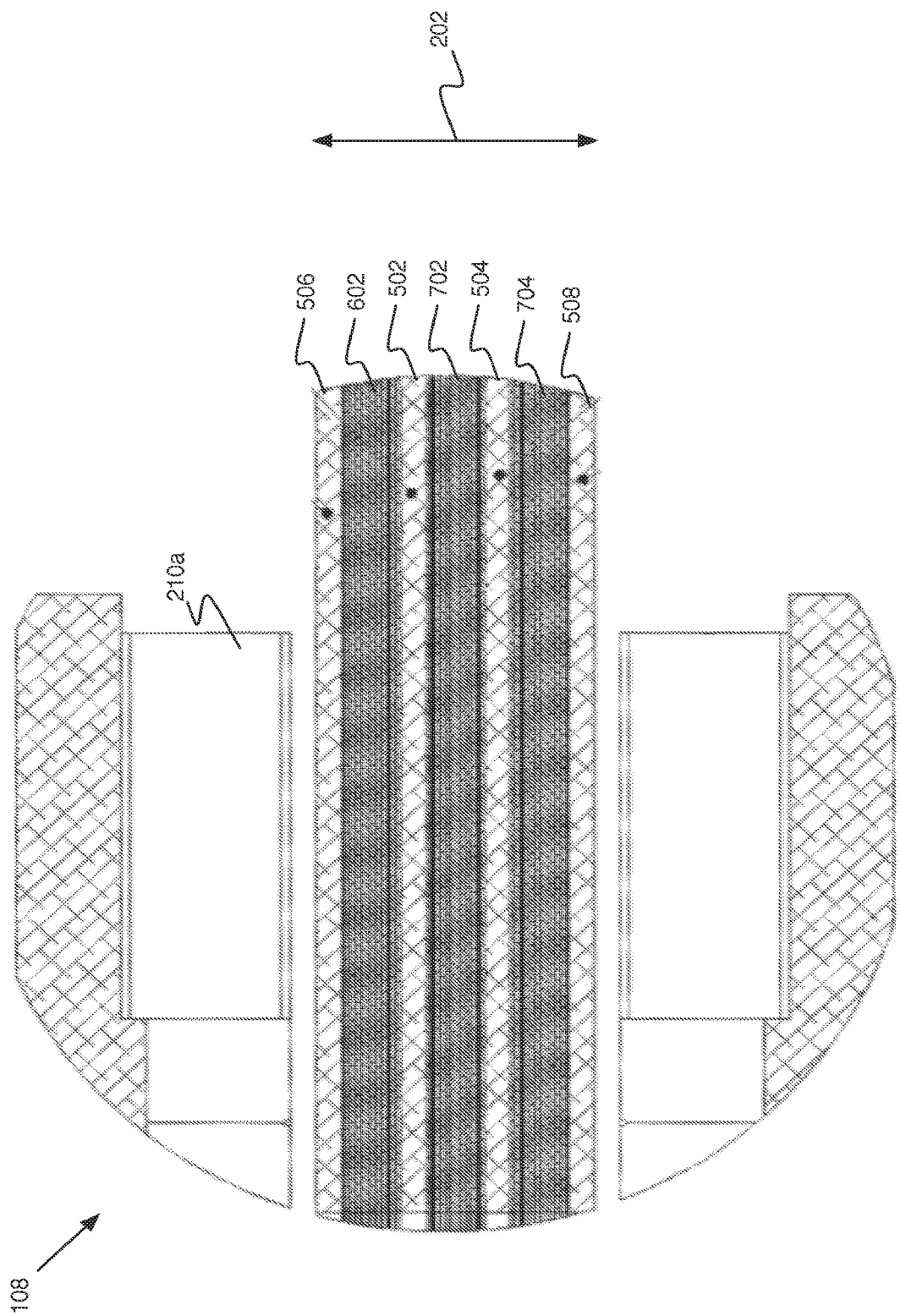
FIG. 5: shows axial motor 108 in accordance with an embodiment of the disclosure.

FIG. 2 depicts a top view and FIG. 3 depicts an isometric view of example axial motor 108, in accordance with an embodiment. FIG. 4 depicts the cross section A-A of motor 108 depicted in FIG. 2, and FIG. 5 provides a close-up detail of section B of FIG. 4.

As may be seen in FIGS. 2 and 3, motor 108 includes a PCB 202 and a rotor 204.

PCB 202 is the stationary portion of a brushless motor, or induction motor, that includes one or more stators including one or more motor phases, or motor coil assemblies comprising the multiphase electromagnet that may be used to drive rotor 204. In examples, the PCB may be single-sided, double-sided, or multi-layered.

Motor 108 includes rotor 204. Rotor 204 rotates around axis 208, driven by the electromagnets in PCB 202. Rotor 204 includes permanent magnets. Rotor 204 includes a first ring-shaped magnet 210a which may incorporate an alternating pole arrangement.

In examples, PCB 202 may include features enabling the integration of PCB 202 to a rotatable device assembly (not shown). For example PCB 202 may include one or more holes 206 that may be used with fasteners to couple PCB 202 to a rotatable device assembly.

In examples, rotor 204 may include features enabling the integration of rotor 204 into a rotatable device assembly. For example, rotor 204 may include an integrated axis 208 upon which bearings 214a and 214b may be positioned. Bearings 214a and 214b may be used to couple rotor 204 to rotatable device assembly.

Figure 6:
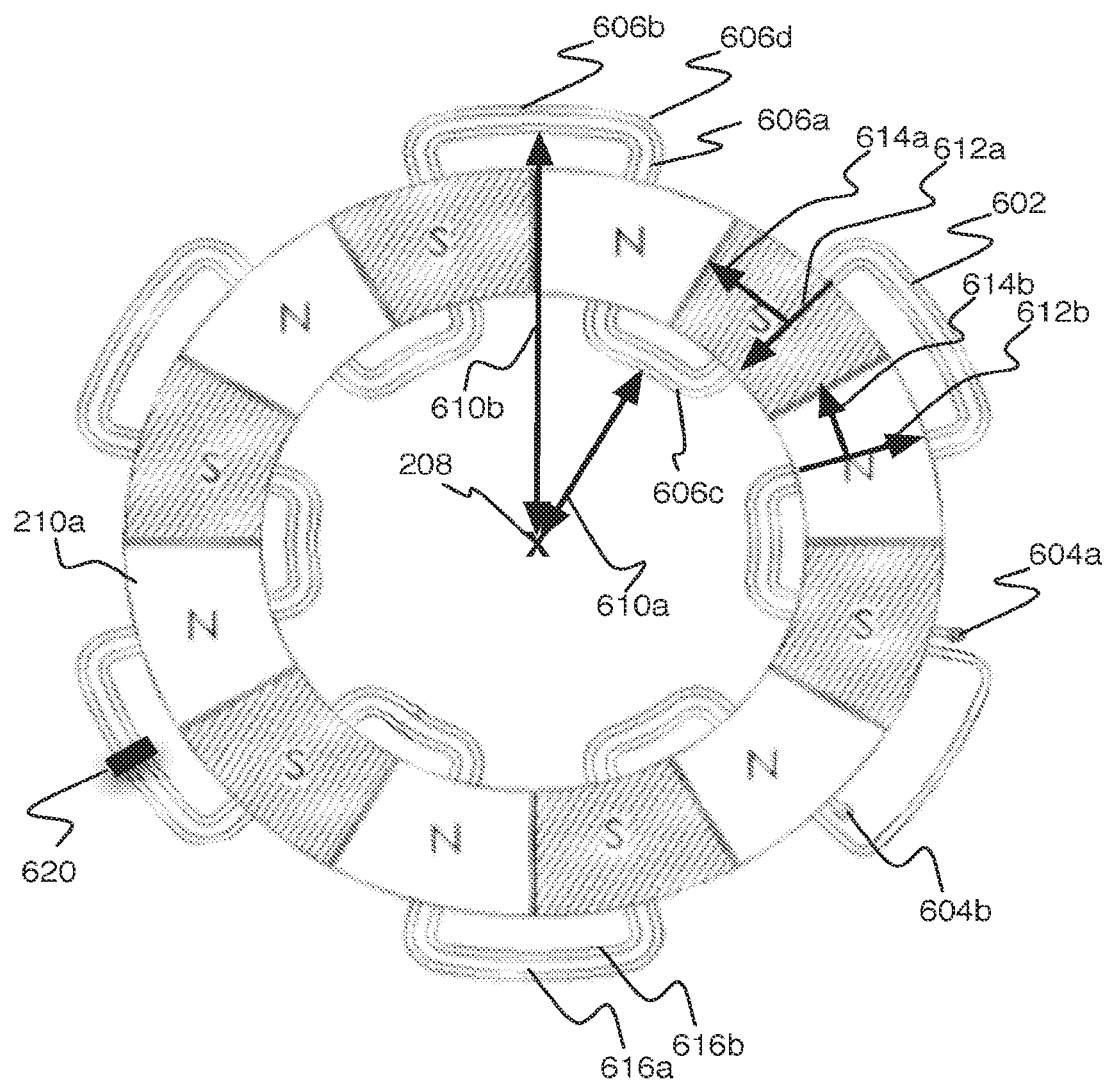
FIG. 6: shows a cross section of axial motor 108 in accordance with an embodiment of the disclosure.

As may be seen in FIG. 6, first ring-shaped magnet 210a includes pairs of magnets in an alternating pole arrangement, with axially-oriented alternating north and south poles. In the example of the figures, first ring-shaped magnet 210a includes six pairs of magnets.

First motor coil 602 is a coil included in a stator of motor 108. First motor coil 602 includes a curvilinear design with substantially radial segments 606a, inner-arced segments 606c, and outer arched segments 606b.

Substantially radial segments 606a of first motor coil 602 are oriented to be substantially radial along the plane of the first motor coil element 602 away from motor axis 208.

Substantially radial may mean radial, or within 0 to 20 degrees of a radius from axis 208 in the plane of PCB 202.

Inner arched segments 606c of first motor coil 602 may substantially follow an arc of a circle circumference with a radius of inner diameter 610a. In examples, the distance between inner arched segment 606c and axis 208 may be within 0-20% of inner diameter 610a.

Outer arched segments 606b of first motor coil 602 may substantially follow an arc of a circle circumference with a radius of an outer diameter 610b. In examples, the distance between outer arched segment 606b and axis 208 may be within 0-20% of inner diameter 610b.

Each substantially radial segment is 606a is connected to at least one inner arched segment 606c or outer arched segment 606b via connecting segments 606d. In examples, connecting segments 606d may be square or rounded.

Motor 108 operates by energizing phases of a stator. In examples, a stator may include two coils, three coils, or any other number of coils commonly known to those of skill in the art.

Upon energizing a phase, current will flow through first motor coil 602, generating an electromagnet. When energized, the current in first motor coil 602 induces the following Lorentz force F 614a:

$$F = i * L \times B \quad \text{(Equation 1)}$$

In Equation 1, i represents current L, such as currents 612a or 612b, is the length of a segment, such as segments 606a, 606b, or 606c, and B is the magnetic field from a ring-shaped magnet, such as first ring-shaped magnet 210a. As may be seen in FIG. 6, when current 612a flows inward via a substantially radial segment 606a, and the nearest pole of first ring-shaped magnet 210a is south, the Lorentz force 614 is directed in a tangential, counterclockwise direction. When current 612b flows outward though a substantially radial segment of first motor coil 602, and the nearest pole of first ring-shaped magnet 210a is north, the Lorentz force 614 also directed in a tangential, counterclockwise direction.

The Lorenz forces from inner arched segments 606c and outer arched segments 606b oppose one another in the axial direction, thereby canceling out.

First motor coil 602 includes a first terminal 604a and a second terminal 604b that may be used to apply a current in a first direction or a second direction to first motor coil 602. By alternating the current across first and second terminals 604a and 604b, it is possible to control the rotation of rotor 202.

In the example of FIG. 6, first motor coil 602 includes two turns: first turn 616a and second turn 616b. This is not intended to be limiting, however. In examples, first motor coil 602 may include a single turn, or any number of turns, as will be understood by those of skill in the art. In examples, first turn 616a and second turn 616b may be connected, to create one motor coil. This may allow for the creation of a stronger electromagnet.

In the example of FIG. 6, first ring-shaped magnet 210a includes six magnet pole pairs, and first motor coil 602 includes twelve substantially radial segments 606a that provide as six electromagnet pairs. This is not intended to be limiting, however. As those of skill in the art will understand, however, any number of magnet pole pairs are possible.

In examples, first ring-shaped magnet 210a may include an alternating pole arrangement.

In examples, first ring-shaped magnet 210a may include a circular array of permanent magnets bonded together. In further examples, first ring-shaped magnet may include a circular array of arc-shaped permanent magnets bonded together.

An axial flux motor fabricated with motor coils formed on a PCB and a rotor with a ring-shaped alternating pole magnet may be efficient and low cost to manufacture and assemble.

In examples, first ring-shaped magnet 210a may be formed from a unitary body. In examples, the unitary body may comprise a unitary permanent magnet magnetized into the alternating pole arrangement with an electromagnet.

Providing a ring-shaped magnet with a unitary body may reduce assembly costs, and reduce the risk of imbalances that may be caused by using individual magnet segments.

In examples, motor 108 may further include a second ring-shaped magnet coupled to the rotor. Second ring-shaped magnet may be substantially similar to first ring-shaped magnet 210a. FIG. 4 depicts example second ring-shaped magnet 210b. In FIG. 4, the first ring-shaped magnet 210a is coupled to a first side of rotor 204, and second ring-shaped magnet 210b is coupled to a second side of the rotor 204.

In examples, PCB 202 may include a second motor coil. Second motor coil may be similar to first motor coil 602. In examples, second motor coil 702 may be positioned in PCB 202 to be substantially axially co aligned with first motor coil 602.

First motor coil 602 and second motor coil 702 may be positioned on different layers of PCB 202. For example, FIG. 5 depicts a side cutaway view detail of PCB 202 where the various layers of PCB 202 may be seen. In the example of PCB 202, first motor coil 602 is positioned on a different layer from second motor coil 702.

Figure 7:
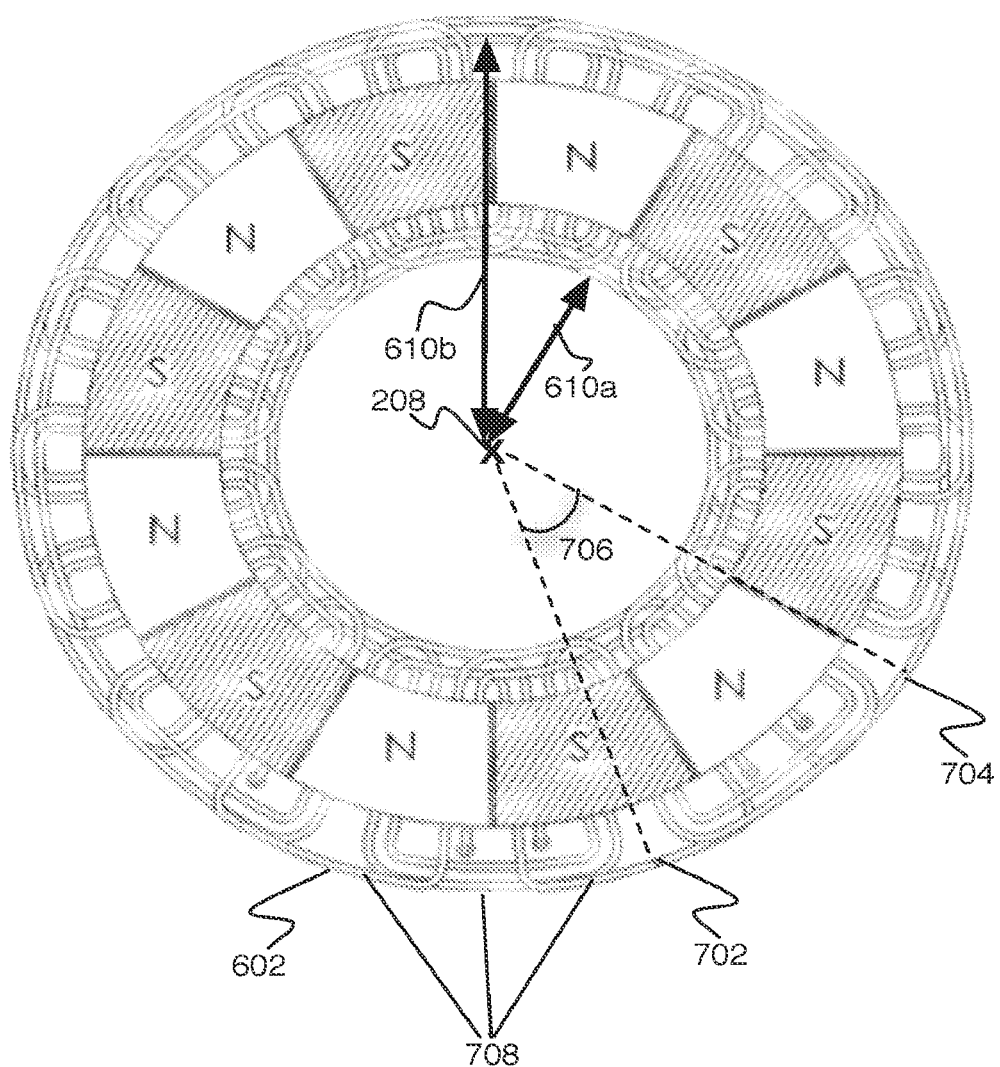
FIG. 7: shows a cross section of axial motor 108 in accordance with an embodiment of the disclosure.

In examples, motor 108 may include a first stator including two or more motor coils. For example, first stator 708 may include first and second motor coils 602 and 702. For example, FIG. 7 provides a top-down view of first ring-shaped magnet 210a overlaid with first motor coil 602 and second motor coil 702. Second motor coil 702 may offset at offset angle 706 with respect to first motor coil 602.

In examples, first stator 708 may include a further motor coil, such as third motor coil 704. Example third motor coil 704 is depicted in FIGS. 5 and 7.

First, second, and third coils 602, 702, and 704 may be used to energize various phases of the first stator 708. For example, first, second, and third coils 602, 702, and 704 may be configured into a delta or a wye configuration.

In examples, the first motor coil may be part of first stator 708 having a first motor torque/speed constant. The second motor coil may be part of a second stator having a second torque/speed constant. By motor torque/speed constant, what is meant is either a motor torque constant or a motor velocity constant, the motor torque constant being inversely proportional to the motor velocity constant.

In examples the first motor torque/speed constant and the second motor torque/speed constant may be the same. In further examples, however, the first motor torque/speed constant and the second motor torque/speed constant may be different.

Different motor torque/speed constants may accommodate rotatable device applications that require both a first mode including a low torque/high speed configuration, and a second mode including a high torque/low speed configuration. For example, a spacecraft reaction wheel may nominally operate in the first mode. If a bearing begins to drag or become erratic, causing vibrations or jerking in the spacecraft, it may be possible to operate in the second mode.

In examples, first stator 708 may include a first motor torque/speed constant that is configurable via a configuration device. Configuration devices may include a relay, switch, jumper, or an FPGA that controls an output to the different stators. For example, the first stator 708 may include a first motor coil that may be coupled via a jumper to a second motor coil.

For example, a configuration device 620 may allow for the two turns of first motor coil 602 to be coupled together. In further examples, configuration device may allow a selection of a delta or wye configuration in a stator.

In examples, rotor 204 may further comprise a rotating magnetic return path. Rotating magnetic return path may rotate with rotor 204 and couple the magnetic field behind the magnets. In examples, the rotating magnetic return path may be integral to the body of rotor 204. In further examples, however, the rotating magnetic return path may be coupled to rotor 204.

In examples, rotating magnetic return path 213*a* may comprise magnetic return field iron. In further examples, rotating magnetic return path 213*a* may comprise magnetically permeable steel.

By rotating ring-shaped magnet 210 with the magnetic return, switching magnetic fields between the rotating and stationary components may be avoided. Rotating magnetic return path 213*a* may thus provide an electrically efficient and vibration-reduced operation.

In examples, rotating magnetic return path 213*a* may be coupled to additional structure in rotor 204. For example, rotating magnetic return path 213*a* may be coupled to an inertial load.

In examples, PCB 202 may provide an integrated motor control electronics. Motor control electronics may be used to operate the motor, for example by receiving a command, energizing various motor coils, and determining the position of the rotor with respect to the stator.

Motor control electronics 106 may include a power conditioning system. For example, a power conditioning system may include DC/DC converters to bring a satellites battery voltage down or up to the necessary motor voltage.

Motor control electronics 106 may further include a processor. For example, the processor may include an FPGA and/or a microprocessor.

Motor control electronics 106 may further include a drive system. For example, for a three phase stator, three full H-Bridge switches may be used to energize the motor coils.

Motor control electronics 106 may further include a position sensing system. For example, for a three phase stator, three hall sensors may be used to determine the position of the ring-shaped magnet. The ring-shaped magnet position information may be used to control the commutation sequence.

Motor control electronics 106 may include further electronics subsystems, as will be understood by those of skill in the art.

In examples, PCB 202 may include at least one motor control electronics component mechanically coupled to PCB 202. In examples, mechanically coupling a motor control electronics component may include forming an electronics pad on the PCB and soldering the pins of the motor control electronic component to the electronics pad.

An electronics pad is a metallic seat that may electrically connect the pins of an electronics component to one or more traces within a PCB, as will be understood by those of skill. Electronics pads are typically formed out of copper on a surface of a PCB, similar to the way that traces are formed.

In examples, the motor control electronics component may include a portion of the power conditioning system, the processor, the drive system, or the position sensing system. In examples, the at least one motor control electronics may include any electronic component that is typically coupled to a PCB, including but not limited to a: resistor, capacitor, FPGA, microprocessor, integrated circuit, diode, transistor, switch, or any other electronic component commonly known to those of skill in the art.

Integrating electronics with motor coils may lower the cost of assembling and increase the reliability of motor 108 by removing the need for electrical connectors, harnessing, and manual assembly steps.

In examples, PCB 202 may include two sets of integrated electronics. In examples, a first set of electronics may be electrically coupled to a first stator and a second set of electronics may be electrically coupled to a second stator.

In examples, motor 108 may further include a high thermal conductivity element. A high thermal conductivity element includes a higher thermal conductivity than a substrate of a PCB, thereby operating as a heat spreader or a heat sink for excess heat generated in the PCB. In examples, high thermal conductivity element may include a thermal conductivity that is greater than 1 W/mK. In further examples, however, high thermal conductivity element may include a thermal conductivity that is greater than 10 W/mK. In other examples, high thermal conductivity layer may include a thermal conductivity that is 1-4000 W/mK greater than a substrate of a PCB.

High thermal conductivity element may be positioned adjacent to the first motor coil in PCB 202, operable to conduct heat away from a motor coil.

For example, FIG. 5 depicts high thermal conductivity element 502. In examples, high thermal conductivity element 502 may be positioned adjacent to first motor coil 602. High thermal conductivity element 502 may therefore conduct heat away from first motor coil 602.

By providing a high thermal conductivity element, it may be possible to spread heat away from a motor coil. This may prevent warping or failure of PCB 202 due to overheating, providing a more robust motor 108. High thermal conductivity element 502 may allow motor 108 to carry higher current, enabling higher torque applications. High thermal conductivity layer may further enable motors 108 to be utilized in a vacuum where no air is present for cooling.

In examples, the high thermal conductivity element may include a non-electrically conductive material and a non-metallic high thermal conductivity material. In examples, the non-metallic high thermal conductivity material may be impregnated into the non-electrically conductive material. In further examples, however, the non-electrically conductive material may be coupled to the non-metallic high thermal conductivity material.

In examples, the non-electrically conductive material may include a matrix, an epoxy, resin, or laminate. In examples, the non-metallic high thermal conductivity material may include carbon fiber, graphite, ceramic, or any other material known to those of skill in the art.

Figure 8:
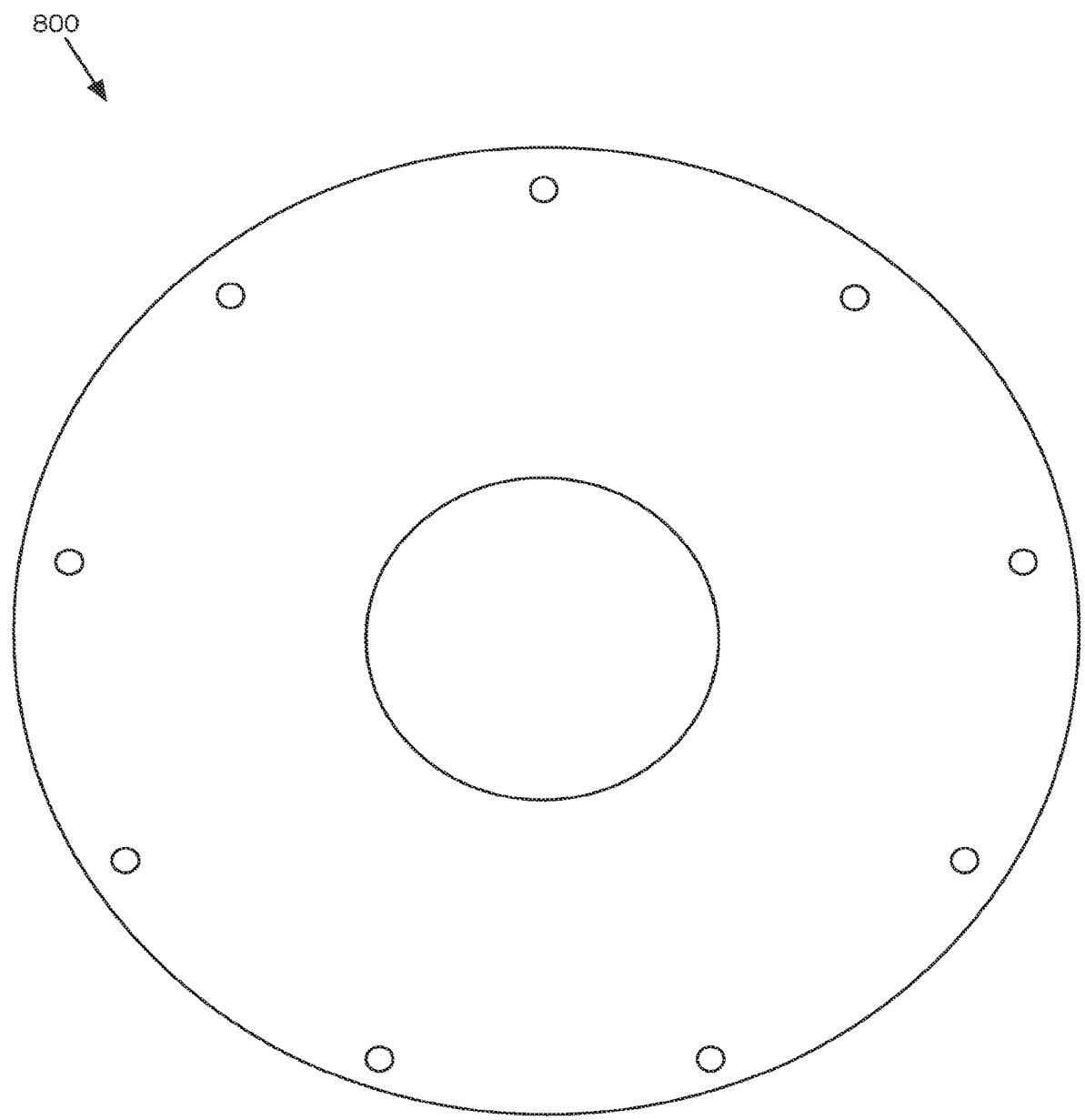
FIG. 8: shows a high thermal conductivity element 800 in accordance with an embodiment of the disclosure.

For example, FIG. 8 depicts example high thermal conductivity element 800. In examples, high thermal conductivity element 800 may be formed to cover substantially the entire surface area of a layer of PCB 202.

In examples, carbon fiber may provide a low thermal expansion and high PCB stiffness, minimizing thermal distortion in motor 108. Providing a carbon fiber material in PCB 202 may further help suppress electromagnetic interference noise originating in the motor coil because carbon fiber can provide some shielding. Providing a carbon fiber material may further allow the PCB to be stiffer and more dependable.

In examples, a high thermal conductivity element including carbon fiber may conduct heat efficiently along the length of the carbon fiber. The low thermal expansion and high stiffness of the carbon fiber may minimize thermal distortion.

In examples, a high thermal conductivity element including a non-metallic high thermal conductivity material may minimize eddy currents that would be present with an electrically conductive material, generating resistive torques, causing inefficiencies and wasting energy.

In further examples, the high thermal conductivity element may comprise a metallic surface. For example, the metallic surface may include copper, or any other conducting material commonly known to those of skill in the art.

Figure 9:
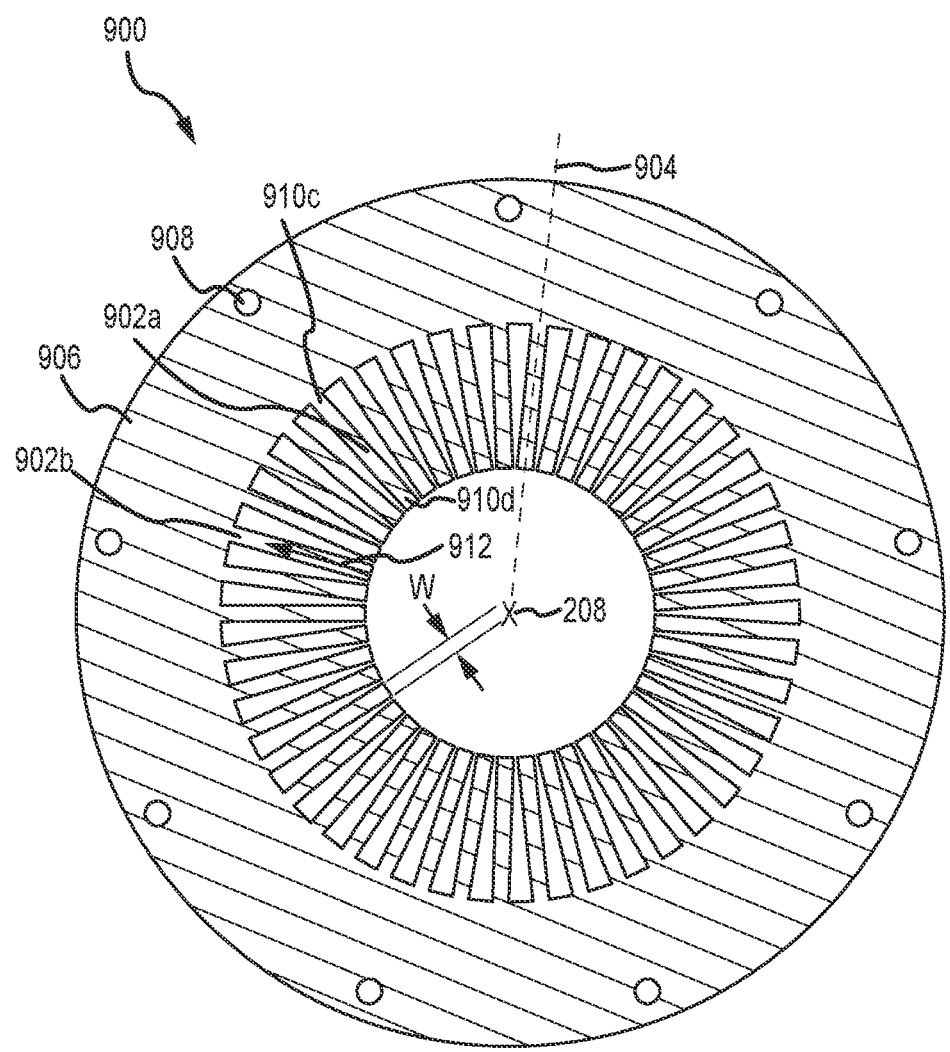
FIG. 9: shows a high thermal conductivity element 900 in accordance with an embodiment of the disclosure.

In examples, the metallic surface may include a plurality of thermal traces, each respective thermal trace having a coupled end and a distal end, the coupled ends of the plurality of thermal traces being jointly coupled. For example, FIG. 9 depicts example high thermal conductivity element 900. High thermal conductivity element 900 includes a plurality of thermal traces, including thermal trace 902b.

As may be seen, thermal trace 902a includes a distal end 910d and a coupled end 910c. Coupled end 910c is thermally coupled to all coupled ends of each of the plurality of thermal traces. Distal end 910d is not coupled to any other thermal trace.

In examples, the plurality of thermal traces may each be substantially the same shape. For example, the thermal traces may be substantially rectangular, "s" shaped, curvilinear, branched in shape, or any other shape known to those of skill that would allow heat to be removed from a motor coil. In further examples, however, the plurality of thermal traces may include different shapes.

In examples, each respective thermal trace of the plurality of thermal traces may be non-looping. For example, FIG. 9 depicts thermal traces 902a and 902b, which include a rectangular, non-looping shape. In examples, the non-looping shape may reduce the generation of eddy currents in motor 108.

In examples, the plurality of thermal traces may conduct heat substantially in an outwardly radial direction with respect to axis 208. For example, thermal trace 902b may conduct heat in the direction of arrow 912.

In examples, the thermal traces 902a and 902b may be sufficiently narrow to avoid losses due to the generation of eddy currents in motor 108. In examples, at least a portion of the thermal traces may have a width W that is less than 0.1 inches wide to prevent the generation of eddy currents.

In examples, the plurality of thermal traces may allow high thermal conductivity element 502 to be manufactured during the PCB process, keeping costs down.

In examples, high thermal conductivity element 900 may further include an outer heat spreader section 906 thermally coupled to the coupled ends of the plurality of thermal traces. In examples, outer heat spreader section may be annular in shape. Outer heat spreader section may couple thermal traces 902 to a heat sink. For example, outer heat spreader section 906 may connect thermal traces 902a and 902b to a chassis via mounting holes 908.

In examples, PCB 202 may further include a second high thermal conductivity element. For example, FIG. 5 depicts second high thermal conductivity element 504. In the example of FIG. 5, first high conductivity element 502 is positioned adjacent to first motor coil 602, and second high thermal conductivity element 504 is positioned adjacent to second motor coil 702, opposite first motor coil 602.

The example of FIG. 5 is not intended to be limiting, however. As those of skill in the art will readily understand, further configurations are possible. For example, PCB 202 may include a third high thermal conductivity element 506 adjacent to first motor coil 602 opposite first high thermal conductivity element 502. PCB 202 may further include third motor coil 704 and/or fourth high thermal conductivity element 508.

Figure 10:
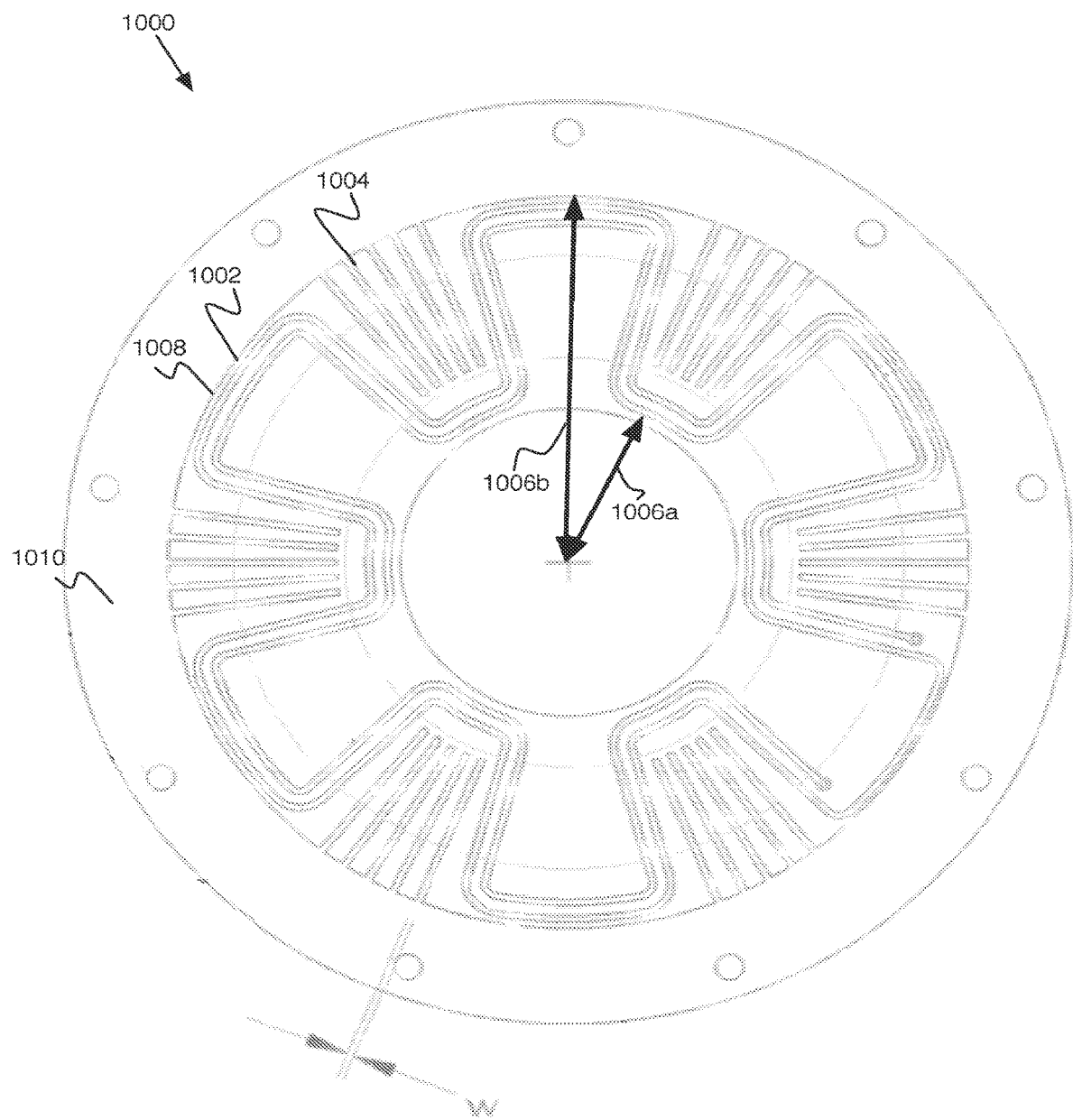
FIG. 10: shows a thermal motor phase layer 1000 in accordance with an embodiment of the disclosure.

In further examples, first high thermal conductivity element 502 may include thermal traces that are coplanar with the first motor coil. For example, FIG. 10 depicts first thermal motor phase layer 1000 of PCB 202. First thermal motor phase layer 1000 includes first motor coil 1002 and coplanar thermal traces 1004.

In examples, at least a portion of the thermal traces may extend into an area between outer diameter 1006b and inner diameter 1006a of the first motor coil 1002 to provide a first thermal motor phase layer 1000.

In examples, second high thermal conductivity element 504 may be coplanar with second motor coil 702 to form a second thermal motor phase layer. In examples, second thermal motor phase layer may be similar to first thermal motor phase layer 1000.

In examples, first thermal motor phase layer 1000 and second thermal motor phase layer may be positioned adjacent to one another. In examples, second thermal motor phase layer may be offset at an offset angle, for example offset angle 706 of FIG. 7, with respect to first thermal motor phase layer 1000 in PCB 202.

In examples, by offsetting the phases of first and second thermal motor phase layers, it may be possible for thermal traces 1004 of first thermal motor phase layer to overlap with outer arch segment 1008 of second thermal motor phase layer.

Offsetting the phases may provide for a shortened path for heat flow that is equal to a PCB layer as heat flows from a motor coil in one layer to a finger formation 902 in another layer. Offsetting the phases may further allow motor 108 to be configured to prevent one motor coil from electrically interacting with an adjacent motor coil.

In examples, heat may flow from thermal traces 1002 of first thermal motor phase layer 1000 into outer heat spreader section 1010.

Figure 11:
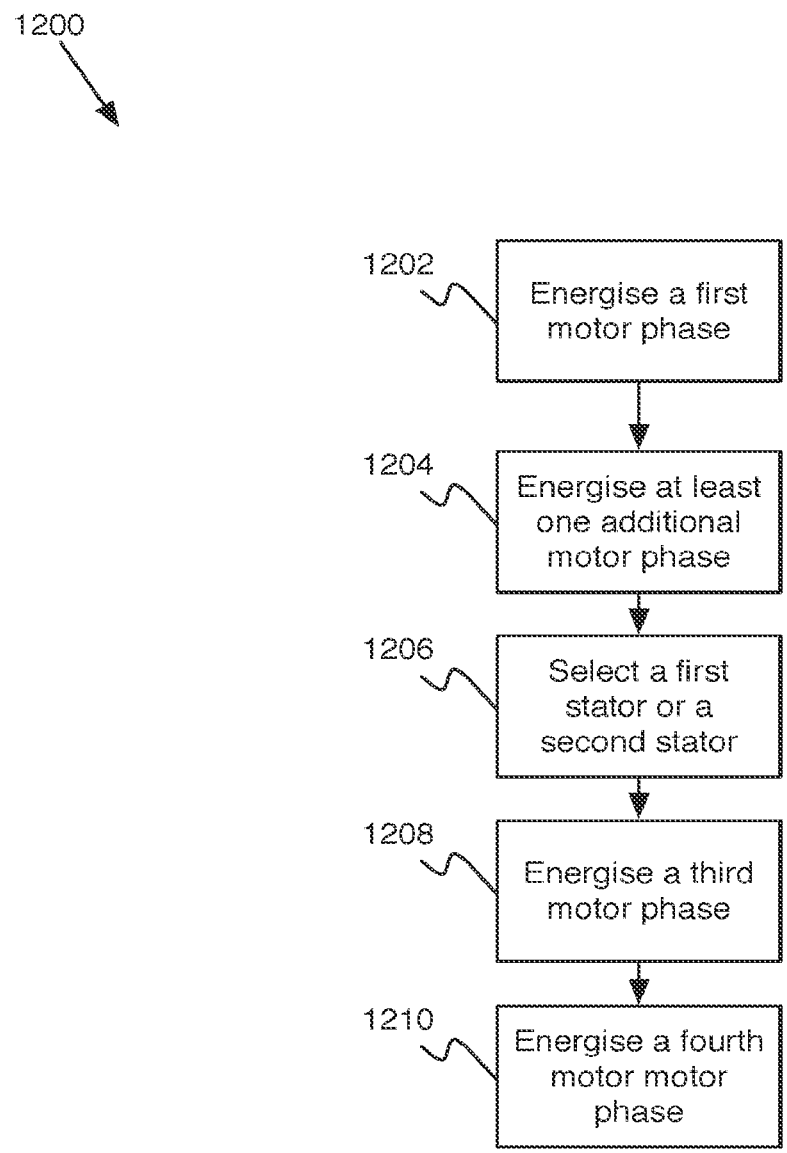
FIG. 11: shows method 1200 in accordance with an embodiment of the disclosure.

FIG. 11 depicts method 1200. Method 1200 is a method for controlling a spacecraft attitude using a rotational device including an axial flux motor. In examples, method 1200 may be performed with motor 108.

Method 1200 begins with step 1202. In step 1202, a first motor phase is energized of the axial flux motor. The axial flux motor comprises a PCB comprising a stator including the first motor coil. The axial flux motor further includes a rotor coupled to a first ring-shaped magnet having an alternating pole arrangement.

Method 1200 continues with step 1204. In step 1204, at least one additional motor phase is energized. For example, current may be passed through second motor coil 702, energizing the element.

In examples of method 1200, the first ring-shaped magnet may be a unitary body.

In examples, method 1200 may include further steps. For example, method 1200 may include step 1206. In step 1206, a configuration device may be used to select at least one of the first stator or the second stator.

In examples of method 1200, may include step 1208. In step 1208, the first phase and the second phase may be part of the first stator, and a third phase may be energized. The first stator may include a first motor torque/speed constant and the second stator may include a second motor torque/speed constant.

In examples, the first motor torque/speed constant may be different from the second motor torque/speed constant. In further examples, however, the first motor torque/speed constant may be the same as second motor torque/speed constant.

In examples, method 1200 may include step 1208. In step 1208, current may be passed through the third motor coil of the PCB of the axial flux motor. This may energize the third motor coil.

Figure 12A:
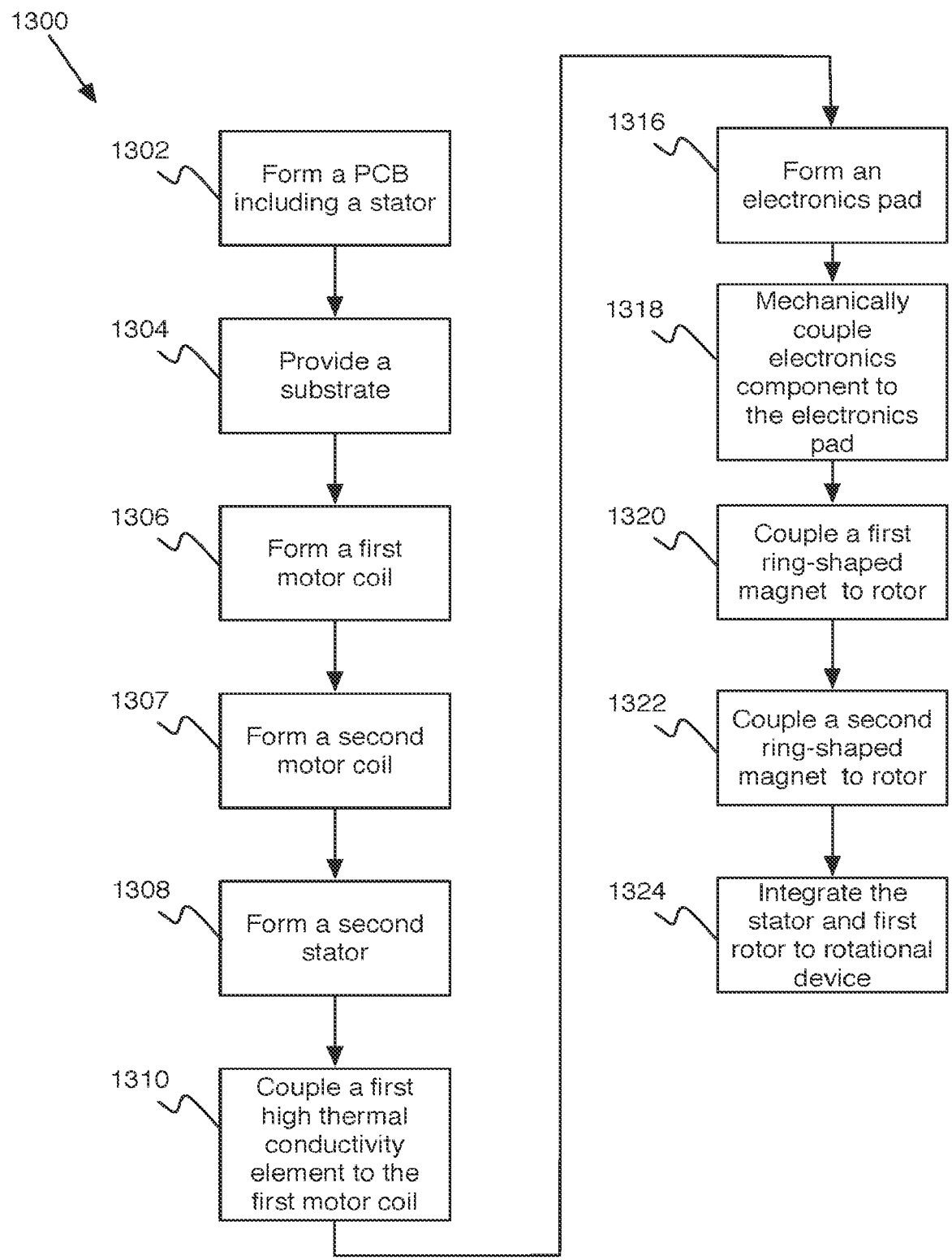
FIG. 12A: shows method 1300 in accordance with an embodiment of the disclosure.

FIG. 12A depicts method 1300. Method 1300 may be used to manufacture an axial flux motor, and includes steps 1302, 1304, 1306, 1320, and 1324.

Method 1300 begins with step 1302. In step 1302, a printed circuit board (PCB) including a stator is formed. Step 1302 includes steps 1304 and 1306.

In step 1304, a substrate is provided. A substrate is a non-conductive layer in a PCB with a surface upon which conductive traces and electronic components may be mechanically positioned. Substrate materials may include FR-2, FR-4, polyimide, or any other type of substrate material known to those of skill in the art.

Method 1300 continues with step 1306. In step 1306, a first motor coil is formed on the substrate. In examples, first motor coil 602 may comprise metallic traces on the substrate. For example, first motor coil 602 may include forming copper traces formed on a surface of the substrate by plating the surface with copper and using a photo-etching process to form the motor coil. First motor coil 602 may be alternatively formed using other semi-additive, subtractive, or laser resist ablation methods, or any other methods understood by those of skill in the art.

In examples, method 1300 may further include step 1307. In step 1307, a second motor coil may be formed adjacent the first motor coil opposite the substrate. In examples, step 1307 may form second motor coil similar to first motor coils in step 1306.

In examples, second motor coil may be formed on a surface of the substrate opposite the first motor coil, or a first substrate. In further examples, second motor coil may be formed on a surface of a second substrate. The first and second substrates may subsequently be coupled directly to one another. In further examples, the first and second substrates may be coupled to one another via one or more intermediary PCB layers, as will be understood by those of skill in the art.

Method 1300 may further include step 1308. In step 1308, the first motor coil and the at least a second motor coil may comprise a first stator. A second stator may be formed adjacent the second motor coil opposite the first motor coil, similar to steps 1304, 1306, and 1307 described above.

In examples, method 1300 may further include step 1310. In step 1310, a high thermal conductivity element may be coupled to the first motor coil. Further examples are provided below with regards to the discussion around FIGS. 12B and 12C.

Figure 12B:
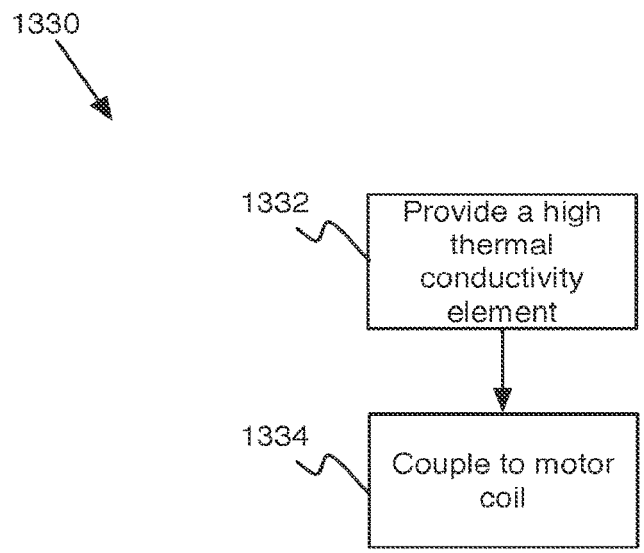
FIG. 12B: shows method 1330 in accordance with an embodiment of the disclosure.

In examples, step 1308 may include the steps of method 1330, depicted in FIG. 12B. Method 1330 begins with step 1332. In step 1332, a high thermal conductivity element including a non-electrically conductive material and a non-metallic high thermal conductivity material may be provided, as described above with respect to FIG. 8.

Method 1300 may continue with step 1334. In step 1334, the high thermal conductivity element may be coupled to the first motor coil. In examples, high thermal conductivity element may be incorporated into a layer, and first motor coil may be formed on the surface of a substrate. The layer including high thermal conductivity element may be coupled to the substrate including the motor coil using an adhesive, such as an epoxy. In examples, coupling the high thermal conductivity element to the first motor coil may further include a cure process to harden the epoxy.

Figure 12C:
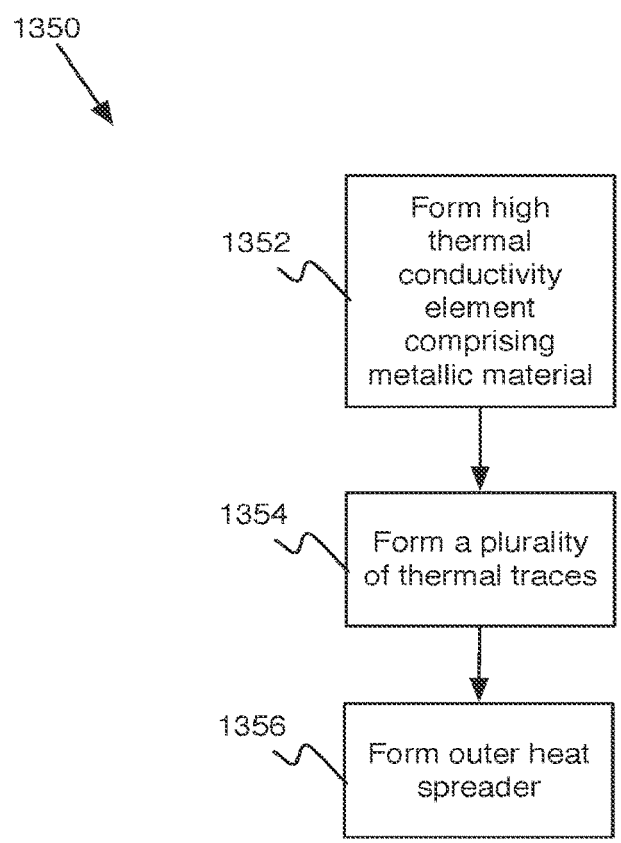
FIG. 12C: shows method 1350 in accordance with an embodiment of the disclosure.

In examples, step 1308 may include the steps of method 1350, as depicted in FIG. 12C. Method 1350 begins with step 1352. In step 1352, a high thermal conductivity element may be formed comprising a metallic surface adjacent to the first motor coil. In examples, the metallic surface may be formed on a substrate using the techniques described to form a motor coil in step 1306.

In examples, method 1350 may further include step 1354. In step 1354, thermal traces are formed in the metallic surface, each respective thermal trace having a coupled end and a distal end, the coupled ends of the plurality of thermal traces being jointly coupled. In examples, the thermal traces may be formed on a substrate using the techniques described with regards to step 1306.

In examples, method 1350 may further include step 1356. In step 1356, an outer heat spreader section may be formed. In examples, the outer heat spreader may serve to further spread heat from a motor coil. In further examples, outer heat spreader may couple the plurality of thermal traces to a heat sink. In examples, the outer heat spreader may be formed using the techniques described with regards to step 1306.

In examples, a motor coil, a plurality of thermal traces, and an outer heat spreader may be formed on a separate surface of one or more substrates. In further examples, however, any combination of motor coil, a plurality of thermal traces, and an outer heat spreader may be formed on the same surface of a substrate in a single step, or multiple steps. In other words, in examples it may be possible to combine any combination of steps 1302, 1350, 1352, and 1354, and 1356 into a single step.

In examples, method 1300 may further include steps 1316 and 1318. In step 1316, an electronics pad may be formed on a surface of the PCB. For example, an electronics pad may be formed in a similar way to the formation of the first motor coil in step 1306.

In step 1318, a motor control electronic component may be mechanically coupled to the electronics pad. For example, integrated motor control electronics may be mechanically coupled to PCB 202 via a press-fit, a solder connection, a surface mount technology, or any other technology known of those of skill in the art. In examples, coupling a motor control electronics component to an electronics pad may further include a soldering step.

Method 1300 continues with step 1320. In step 1320, a first ring-shaped magnet having an alternating pole arrangement is coupled to a rotor. First ring-shaped magnet may be coupled to the rotor using any type of coupling device or fastener known to those of skill in the art.

Method 1300 continues with step 1324. In step 1324, the PCB and the rotor are integrated into the rotational device. For example, the PCB may be coupled to a rotational device assembly via a fastener passing through holes 206. Axis 208 of rotor 204 may be further coupled to the rotational device assembly via bearings 214a and 214b.

In examples, rotor 204 may further include a rotating magnetic return path 213a. For example, rotating magnetic return path 213a may comprise a magnetically permeable steel.

In a further embodiment, axial flux motor 108 may include a rotor 204 including permanent magnets, and a PCB 202. The PCB 202 may include a stator comprising a first motor coil, and a first high thermal conductivity element adjacent to the first motor coil, as described above.

In examples, the first high thermal conductivity element may comprise a metallic surface, as described above.

In examples, the metallic surface may include a plurality of thermal traces, each respective thermal trace having a coupled end and a distal end, the coupled ends of the plurality of thermal traces being jointly coupled, as described above.

In examples, each respective thermal trace of the plurality of thermal traces may be non-looping.

In examples, the plurality of thermal traces conduct may conduct heat in a substantially outwardly radial direction.

Figure 13:
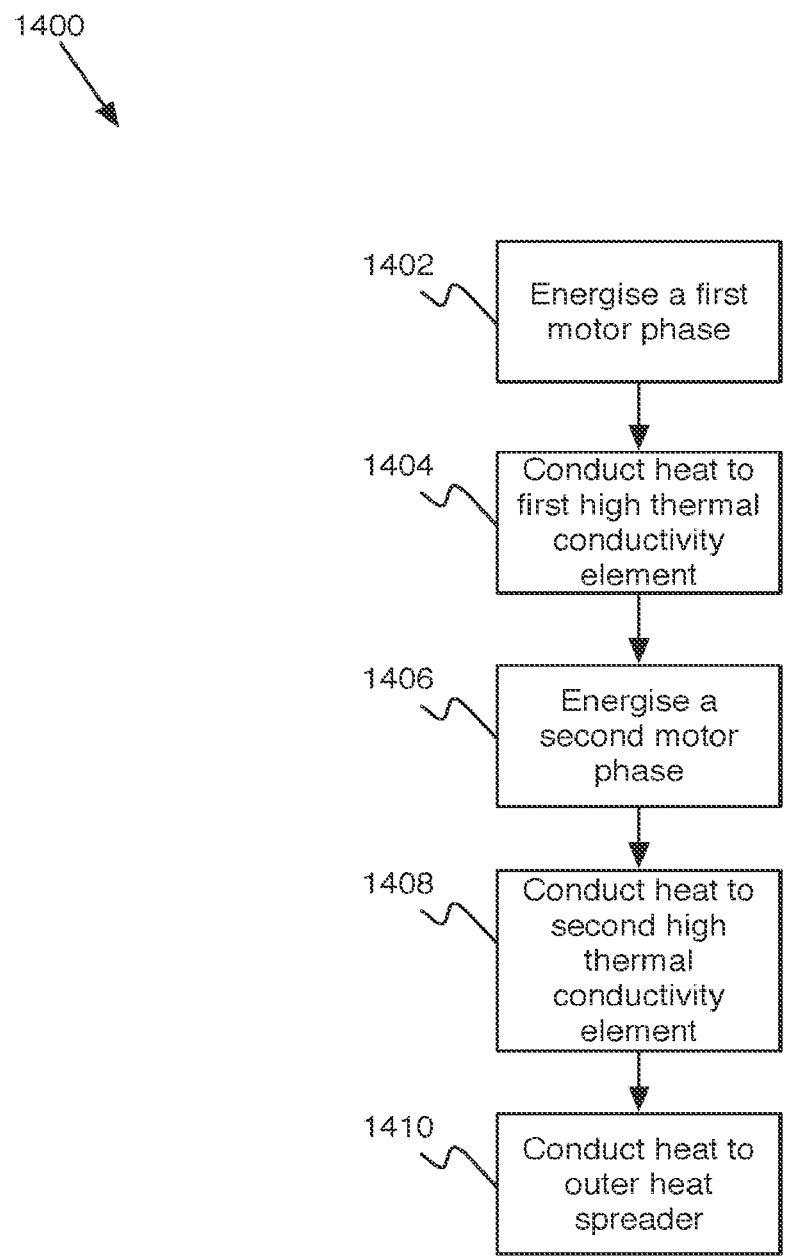
FIG. 13: shows method 1400 in accordance with an embodiment of the disclosure.

FIG. 13 depicts method 1400. Method 1400 may be used to cool an axial flux motor on a spacecraft. The axial flux motor comprises a PCB including a stator with a first high thermal conductivity element. Method 1400 begins with step 1402. In step 1402, a first phase of the stator is energized, the stator including a first motor coil, as described above.

Method 1400 continues with step 1404. In step 1404, heat is conducted away from the first motor coil to a first high thermal conductivity element adjacent to the first motor coil, as described above.

In examples, method 1400 may include further steps. For example, method 1400 may include step 1406. In step 1406, a second motor coil may be energized, as described above.

Method 1400 may further include step 1408. In step 1408, heat may be conducted from the first motor coil to a second high thermal conductivity element adjacent to the second motor coil, as described above.

Method 1400 may further include step 1410. In step 1410, heat may be conducted from the first high thermal conductivity element to an outer heat spreader coupled to the first high thermal conductivity element and a reaction wheel assembly, as described above.

Figure 14:
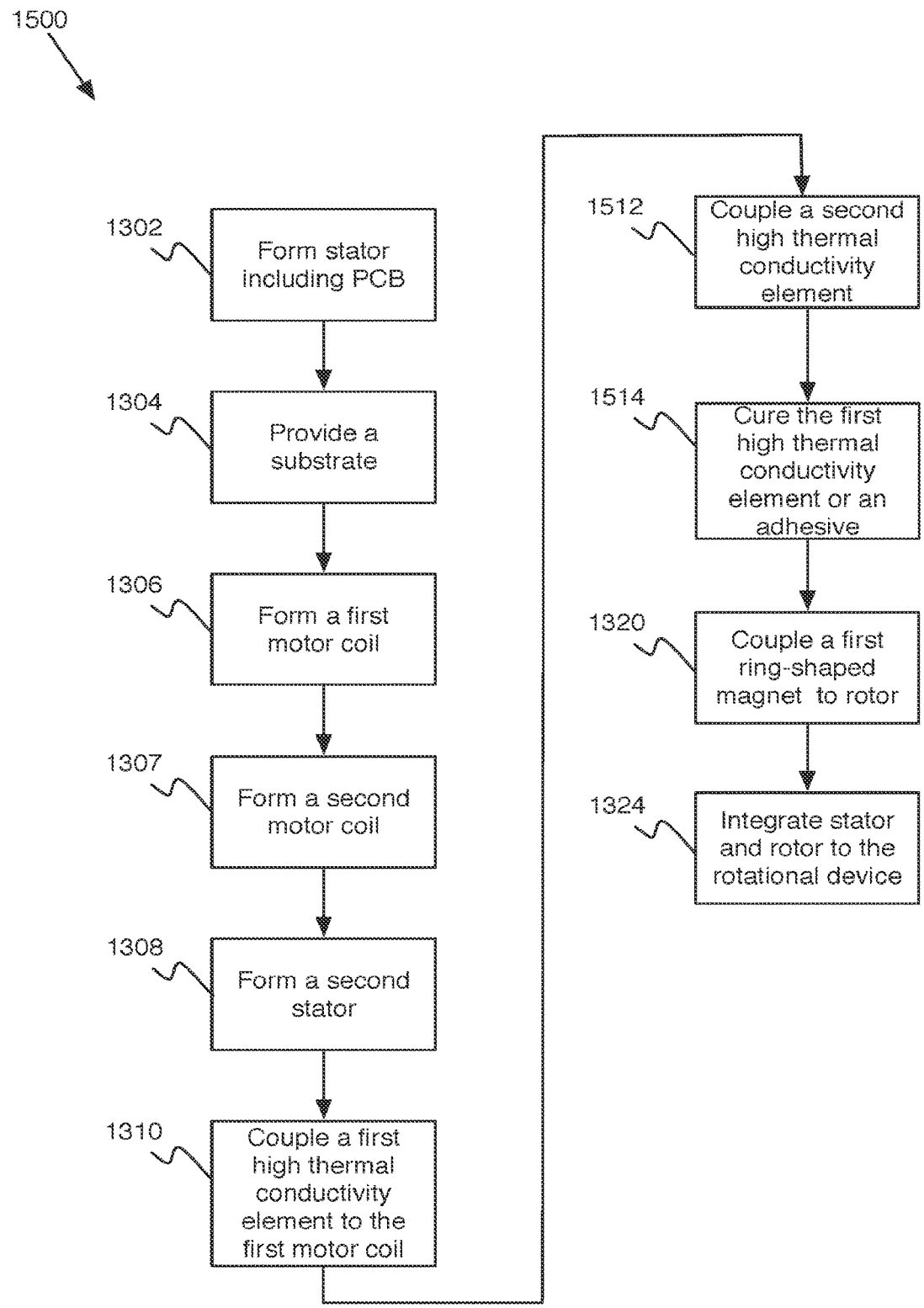
FIG. 14: shows method 1500 in accordance with an embodiment of the disclosure.

FIG. 14 depicts method 1500. Method 1500 includes steps 1302, 1304, 1306, 1310, and 1324, as described above.

Method 1500 begins with steps 1302, 1304, 1306, 1307, 1308, and 1310.

In examples, step 1310 may further include the steps of method 1330, as described above.

In examples, step 1310 may further include the steps of method 1350.

In examples, method 1500 may further include step 1512. In step 1512, a second high thermal conductivity element may be coupled to the second motor coil.

In examples, method 1330 may further include step 1514. In step 1514, at least one of the high thermal conductivity element or an adhesive is cured, the adhesive coupling the high thermal conductivity element to the first motor coil. By cured, the non-electrically conductive material of the high thermal conductivity element or the adhesive may be hardened via a baking or drying process.

In examples, method 1500 may further include step 1320.

In examples, at least a portion of the thermal traces may include a width less than 0.1 inches wide, as described above.

In examples, the plurality of thermal traces may be coplanar with the first motor coil, as described above.

In examples, the first high thermal conductivity element and the first motor coil may comprise a first thermal motor phase layer, and at least a portion of the plurality of thermal traces may extend into an area between an outer diameter and an inner diameter of the first thermal motor phase layer, as described above.

In examples, the first high conductivity element may be positioned between the first motor coil and the second motor coil. The second high thermal conductivity element may further be positioned adjacent to the second motor coil, opposite the first high thermal conductivity element.

In examples, the first high conductivity element may be coplanar with the first motor coil, and the second high thermal conductivity element may be coplanar with the second motor coil.

Embodiments of the present disclosure may provide a reaction wheel PCB motor that may be used in a high torque configuration in a vacuum environment with no air cooling.

While the present application has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the application in its broader aspects is not limited to the specific details, representative apparatus and method, and illustrative examples shown and described. Accordingly, departures may be made from such details without departure from the spirit or scope of applicant's general inventive concept.

The invention claimed is:

1. An axial flux motor for a rotational device, comprising:
a printed circuit board (PCB) including a first stator with a first motor coil and a high thermal conductivity element, the first motor coil and the high thermal conductivity element being formed on one or more substrate layers within the PCB;
a rotor comprising a first ring-shaped magnet having an alternating pole arrangement and a rotating magnetic return path,
wherein the high thermal conductivity element comprises a plurality of metallic thermal traces positioned on the one of the one or more substrate layers within the PCB, each respective metallic thermal trace having a coupled end and a distal end, the distal ends not being coupled to any other metallic thermal trace of the plurality of metallic thermal traces, the high thermal conductivity element further comprises an outer heat spreader section thermally coupled to the coupled ends of the metallic plurality of thermal traces, and the high thermal conductivity element is not electrically connected to the first motor coil.

2. The axial flux motor of claim 1, wherein the first ring-shaped magnet is a unitary body.

3. The axial flux motor of claim 1, further comprising:
a second ring-shaped magnet coupled to the rotor, the first ring-shaped magnet coupled to a first side of the rotor, and the second ring-shaped magnet coupled to a second side of the rotor.

4. The axial flux motor of claim 1, wherein the PCB further includes a second motor coil.

5. The axial flux motor of claim 4, wherein the first motor coil is part of the first stator, the first stator having a first motor torque/speed constant, and the PCB further comprises:
a second stator including the second motor coil, the second stator having a second motor torque/speed constant, the first motor torque/speed constant being different from the second motor torque/speed constant.

6. The axial flux motor of claim 4, wherein the first motor coil is part of the first stator, the first stator having a first motor torque/speed constant, and the PCB further comprises:
a second stator including the second motor coil, the second stator having a second motor torque/speed constant, the first motor torque/speed constant being the same as the second motor torque/speed constant.

7. The axial flux motor of claim 4, wherein the first stator includes a first motor torque/speed constant that is configurable via a configuration device.

8. The axial flux motor of claim 1, wherein the high thermal conductivity element includes a metallic surface.

9. The axial flux motor of claim 8, wherein each respective thermal trace of the plurality of metallic thermal traces is non-looping.

10. The axial flux motor of claim 8, wherein the plurality of metallic thermal traces conduct heat substantially in an outwardly radial direction.

11. The axial flux motor of claim 1, wherein the rotating magnetic return path is comprised of a magnetically permeable steel.

12. The axial flux motor of claim 1, wherein the PCB further includes at least one motor control electronics component, the at least one motor control electronics component mechanically coupled to the PCB.

13. The axial flux motor of claim 1, wherein at least one thermal trace of the plurality of metallic thermal traces has a portion with a width that is less than 0.1 inches.

14. The axial flux motor of claim 1, wherein the plurality of metallic thermal traces are coplanar with the first motor coil.

15. The axial flux motor of claim 14, wherein the high thermal conductivity element and the first motor coil comprise a first thermal motor phase layer, and at least a portion of the plurality of metallic thermal traces extend into an area between an outer diameter and an inner diameter of the first thermal motor phase layer.

16. The axial flux motor of claim 1, wherein the PCB further comprises:
a second motor coil; and
a second high thermal conductivity element positioned adjacent to the second motor coil opposite the first high thermal conductivity element.

17. The axial flux motor of claim 16, wherein the second high thermal conductivity element is coplanar with the second motor coil to form a second thermal motor phase layer.

18. A method of controlling a spacecraft attitude using a rotational device including an axial flux motor, the axial flux motor comprising a rotor and a printed circuit board (PCB), the rotor comprising a first ring-shaped magnet having an alternating pole arrangement and a rotating magnetic return path, and the PCB comprising a first stator with a first motor coil and a high thermal conductivity element formed on one or more substrate layers within the PCB, the method comprising:
energizing a first motor phase of the motor coil, wherein the first high thermal conductivity element comprises a plurality of metallic thermal traces positioned on the one of the one or more substrate layers within the PCB, each respective metallic thermal trace having a coupled end and a distal end, the distal ends not being coupled to any other metallic thermal trace of the plurality of metallic thermal traces, the first high thermal conductivity element further comprising an outer heat spreader section thermally coupled to the coupled ends of the metallic plurality of thermal traces, and the high thermal conductivity element not being electrically connected to the first motor coil.

19. The method of claim 18, further comprising:
energizing at least a second phase of the PCB of the axial flux motor.

20. The method claim 19, wherein the first motor phase and the second phase are part of the first stator, and the method further comprises:
energizing an additional motor phase of a second stator, wherein the first stator includes a first motor torque/speed constant and the second stator includes a second motor torque/speed constant, the first motor torque/speed constant being different from the second motor torque/speed constant.

21. The method of claim 20, further comprising:
selecting at least one of the first stator or the second stator using a configuration device.

22. The method claim 19, wherein the first motor phase and the second phase are part of the first stator, and the method further comprises:
energizing an additional motor phase of a second stator, wherein the first stator includes a first motor torque/speed constant and the second stator includes a second motor torque/speed constant, the first motor torque/speed constant being the same as the second motor torque/speed constant.

23. The method of claim 18, wherein the first ring-shaped magnet is a unitary body.

24. A method of cooling an axial flux motor on a spacecraft, the axial flux motor comprising a rotor and a printed circuit board (PCB), the rotor comprising a first ring-shaped magnet having an alternating pole arrangement and a rotating magnetic return path, and the PCB comprising a first stator with a first motor coil and a first high thermal conductivity element formed on one or more substrate layers within the PCB, the method comprising:
energizing a first motor phase of the first motor coil of the stator; and
conducting heat away from the first motor coil via the first high thermal conductivity element, the first high thermal conductivity element being adjacent to the first motor coil,
wherein the first high thermal conductivity element comprises a plurality of metallic thermal traces positioned on one of the one or more substrate layers within the PCB, each respective metallic thermal trace having a coupled end and a distal end, the distal ends not being coupled to any other metallic thermal trace of the plurality of metallic thermal traces, the first high thermal conductivity element further comprising an outer heat spreader section thermally coupled to the coupled ends of the metallic plurality of thermal traces, and the high thermal conductivity element not being electrically connected to the first motor coil.

25. The method of claim 24, wherein the stator further comprises a second motor coil, and the method further comprises:
conducting heat away from the second motor coil to the first high thermal conductivity element, the second motor coil being adjacent to the first high thermal conductivity element.

26. The method of claim 24, wherein the stator further comprises a second motor coil and a second high thermal conductivity element, and the method further comprises:

conducting heat away from the second motor coil to the second high thermal conductivity element, the second motor coil positioned between the first high thermal conductivity element and the second high thermal conductivity element.

27. A method for manufacturing an axial flux motor for a rotational device, the method comprising:
  forming a printed circuit board (PCB) including a stator wherein forming the stator includes:
    providing one or more substrates;
    forming a first motor coil on the one or more substrates; and
    forming the high thermal conductivity element on the one or more substrates by:
      forming a plurality of metallic thermal traces, each respective thermal trace having a coupled end and a distal end, the distal ends not being coupled to any other thermal trace of the plurality of thermal traces, and
      forming an outer heat spreader section thermally coupled to the coupled ends of the plurality of thermal traces, wherein the high thermal conductivity element is not electrically connected to the first motor coil; and
  coupling a first ring-shaped magnet having an alternating pole arrangement to a rotating magnetic return path to form a rotor; and
  integrating the PCB and the rotor.

28. The method of claim 27, wherein at least one thermal trace of the plurality of metallic thermal traces has a portion with a width that is less than 0.1 inches.

29. The method of claim 27, wherein the plurality of metallic thermal traces are coplanar with the first motor coil.

30. The method of claim 29, wherein the first high thermal conductivity element and the first motor coil comprise a first thermal motor phase layer, and at least a portion of the plurality of metallic thermal traces extend into an area between an outer diameter and an inner diameter of the first thermal motor phase layer.

31. The method of claim 27, wherein forming the PCB further comprises:
  forming a second motor coil.

32. The method of claim 31, wherein forming the PCB further comprises:
  coupling a second high thermal conductivity element adjacent the second motor coil.

33. The method of claim 32, wherein the second high thermal conductivity element is positioned between the first motor coil and the second motor coil.

34. The method of claim 32, wherein the first high conductivity element is coplanar with the first motor coil, and the second high thermal conductivity element is coplanar with the second motor coil.

* * * * *